US009656872B2

(12) United States Patent
Dryfe et al.

(10) Patent No.: US 9,656,872 B2
(45) Date of Patent: *May 23, 2017

(54) PRODUCTION OF GRAPHENE

(75) Inventors: Robert Angus William Dryfe, Manchester (GB); Ian Anthony Kinloch, Manchester (GB)

(73) Assignee: The University of Manchester, Manchester (GB)

( * ) Notice: Subject to any disclaimer, the term of this patent is extended or adjusted under 35 U.S.C. 154(b) by 410 days.

This patent is subject to a terminal disclaimer.

(21) Appl. No.: 14/004,365

(22) PCT Filed: Mar. 9, 2012

(86) PCT No.: PCT/GB2012/000233
§ 371 (c)(1),
(2), (4) Date: Nov. 15, 2013

(87) PCT Pub. No.: WO2012/120264
PCT Pub. Date: Sep. 13, 2012

(65) Prior Publication Data
US 2014/0061059 A1 Mar. 6, 2014

(30) Foreign Application Priority Data

Mar. 10, 2011 (GB) .................................. 1104096.1

(51) Int. Cl.
*C01B 31/02* (2006.01)
*C25B 1/00* (2006.01)
*C01B 31/04* (2006.01)
*B82Y 30/00* (2011.01)
*B82Y 40/00* (2011.01)

(52) U.S. Cl.
CPC .......... *C01B 31/0415* (2013.01); *B82Y 30/00* (2013.01); *B82Y 40/00* (2013.01); *C01B 31/0206* (2013.01); *C01B 31/04* (2013.01); *C01B 31/0446* (2013.01); *C01B 31/0469* (2013.01); *C25B 1/00* (2013.01); *C01B 2204/04* (2013.01)

(58) Field of Classification Search
CPC ............ B82Y 30/00; B82Y 40/00; C25B 1/00
USPC ........................................................ 205/555
See application file for complete search history.

(56) References Cited

U.S. PATENT DOCUMENTS

| 4,486,286 A | 12/1984 | Lewin et al. |
| 4,608,133 A | 8/1986 | Morduchowitz et al. |
| 5,824,832 A | 10/1998 | Sherif et al. |
| 7,071,258 B1 | 7/2006 | Jang et al. |
| 2008/0206124 A1 | 8/2008 | Jang et al. |
| 2009/0026086 A1* | 1/2009 | Zhamu et al. ................ 205/555 |
| 2009/0090640 A1 | 4/2009 | Jang et al. |
| 2009/0155578 A1* | 6/2009 | Zhamu ................... B82Y 30/00 428/336 |
| 2009/0169467 A1 | 7/2009 | Zhamu et al. |
| 2013/0102084 A1* | 4/2013 | Loh et al. ....................... 436/94 |
| 2013/0161199 A1 | 6/2013 | Li et al. |
| 2013/0164208 A1 | 6/2013 | Hsieh et al. |
| 2014/0061059 A1 | 3/2014 | Dryfe et al. |

FOREIGN PATENT DOCUMENTS

| CN | 201465309 A | 5/2012 |
| GB | 217115 A | 6/1924 |
| GB | 1109143 A | 4/1968 |
| JP | 2001-89887 A | 4/2001 |
| JP | 2004-143488 A | 5/2004 |
| WO | 00/64808 A1 | 11/2000 |
| WO | 01/15251 A1 | 3/2001 |
| WO | 2007/046716 A1 | 4/2007 |
| WO | 2007/093574 A2 | 8/2007 |
| WO | 2008/019154 A2 | 2/2008 |
| WO | 2011/010109 A1 | 1/2011 |
| WO | 2011/111791 A1 | 9/2011 |
| WO | 2011/162727 A1 | 12/2011 |

OTHER PUBLICATIONS

Liu et al. "Intercalation of Organic Ammonium Ions into Layered Graphite Oxide", Langmuir 2002, 19, 4926-4932.*
Matsuo et al. "Electrochemical fluorination of graphite in 47% HF aqueous solution" Journal of Fluorine Chemistry 87 (1998) 145-150.*
Zboril et al. "Graphene Fluoride: A Stable Stoichiometric Graphene Derivative and its Chemical Conversion to Graphene" Small 2010, 6, No. 24, 2885-2891.*
Chung et al. "Origin of Graphite Exfoliation an Investigation of the Important Role of Solvent Cointercalation" Journal of the Electrochemical Society, 147 (12) 4391-4398 (2000).*
Bensenhard et al. "Cathodic reduction of graphite in organic solutions of alkali and NR4+ salts" Electroanalytical Chemistry and Interfacial Electrochemistry, 53, (1974) 329-333.*
Ang et al., "High-Throughput Synthesis of Graphene by Intercalation-Exfoliation of Graphite Oxide and Study of Ionic Screening in Graphene Transistor," *Journal of the American Chemical Society Nano* 3(11):3587-3594, 2009.
Bae et al., "Roll-to-roll production of 30-inch graphene films for transparent electrodes," *Nature Nanotechnology* 5:574-578, Aug. 2010.
Ferrari et al., "Raman Spectrum of Graphene and Graphene Layers," *Physical Review Letters* 97:187104-1-187104-4, 2006.
Hao et al., "Probing Layer Number and Stacking Order of Few-Layer Graphene by Raman Spectroscopy," *Small* 6(2):195-200, 2010.
Hernandez et al., "High-yield production of graphene by liquid-phase exfoliation of graphite," *Nature Nanotechnology* 3:563-568, 2008.
Kinloch et al., "Electrolytic, TEM and Raman studies on the production of carbon nanotubes in molten NaCl," *Carbon* 41:1127-1141, 2003.
Lee et al., "A graphite foil electrode covered with electrochemically exfoliated graphene nanosheets," *Electrochemistry Communications* 12:1419-1422, 2010.

(Continued)

*Primary Examiner* — Harry D Wilkins, III
(74) *Attorney, Agent, or Firm* — Seed IP Law Group LLP (57) ABSTRACT

A method of producing graphene by the electrochemical insertion of alkylammonium cations in a solvent into graphite is disclosed.

21 Claims, 7 Drawing Sheets

(56) References Cited

OTHER PUBLICATIONS

Liu et al., "One-Step Ionic-Liquid-Assisted Electrochemical Synthesis of Ionic-Liquid-Functionalized Graphene Sheets Directly from Graphite," *Adv. Funct. Mater.* 18:1518-1525, 2008.
Lotya et al., "Liquid Phase Production of Graphene by Exfoliation of Graphite in Surfactant/Water Solutions," *Journal of the American Chemical Society* 131:3611-3620, 2009.
Lu et al., "One-Pot Synthesis of Fluorescent Carbon Nanoribbons, Nanoparticles, and Graphene by the Exfoliation of Graphite in Ionic Liquids," *American Chemical Society Nano* 3(8):2367-2375, 2009.
Morales et al., "High-quality few layer graphene produced by electrochemical intercalation and microwave-assisted expansion of graphite," *Carbon* 49:2809-2816, 2011.
Novoselov et al., "Electric Field Effect in Atomically Thin Carbon Films," *Science* 306:666-669, 2004.
Park et al., "Chemical methods for the production of graphenes," *Nature Nanotechnology* 4:217-224, Apr. 2009.
Schwandt et al., "The preparation of nano-structured carbon materials by electrolysis of molten lithium chloride at graphite electrodes," *Journal of Eletroanalytical Chemistry* 647:150-158, 2010.
Simonet et al., "Electrochemical Behaviour of Graphite Cathodes in the Presence of Tetraalkylammonium Cations," *Journal of Electroanalytical Chemistry* 75:719-730, 1977.
Su et al., "High-Quality Thin Graphene Films from Fast Electrochemical Exfoliation," *Journal of the American Chemical Society Nano* 5(3):2332-2339, 2011.
Vallés et al., "Solutions of Negatively Charged Graphene Sheets and Ribbons," *Journal of the American Chemical Society* 130:15802-15804, 2008.
Wang et al., "Direct exfoliation of natural graphite into micrometor size few layers graphene sheets using ionic liquids," *Chemistry Communication* 46:4487-4489, 2010.
Wang et al., "Highly efficient and large-scale synthesis of graphene by electrolytic exfoliation," *Carbon* 47:3242-3246, 2009.
Wang et al., "High-Yield Synthesis of Few-Layer Graphene Flakes through Electrochemical Expansion of Graphite in Propylene Carbonate Electrolyte," *Journal of the American Chemical Society* 133:8888-8891, 2011.
Alanyalioğlu et al., "The synthesis of graphene sheets with controlled thickness and order using surfactant-assisted electrochemical processes," *Carbon* 50:142-152, 2012.
Augustynski et al., "Electroreduction of Carbon Dioxide in Aqueous Solutions at Metal Electrodes," *American Chemical Society, Division of Fuel Chemistry*, pp. 1420-1424, 1996.
Augustynski et al., "Electroreduction of carbon dioxide in aqueous solutions at metal electrodes," *Preprints of Papers, American Chemical Society, Division of Fuel Chemistry*, 1996, retrieved from http://www.osti.gov/scitech/biblio/430375, retrieved on Oct. 23, 2014, 2 pages.
Cano-Márquez et al., "Ex-MWNTs: Graphene Sheets and Ribbons Produced by Lithium Intercalation and Exfoliation of Carbon Nanotubes," *Nano Letters* 9(4):1527-1533, 2009.
Choi et al., "Improving the electrochemical properties of graphite/$LiCoO_2$ cells in ionic liquid-containing electrolytes," *Journal of Power Sources* 195:2368-2371, 2010.
Deng et al., "The adsorption properties of Pb(II) and Cd(II) on functionalized graphene prepared by electrolysis method," *Journal of Hazardous Materials* 183:923-930, 2010.
DeWulf et al., "Electrochemical and Surface Studies of Carbon Dioxide Reduction to Methane and Ethylene at Copper Electrodes in Aqueous Solutions," *J. Electrochem. Soc.* 136(6):1686-1691, 1989.
Elias et al., "Control of Graphene's Properties by Reversible Hydrogenation: Evidence for Graphene," *Science* 323:610-613, 2009. (16 pages).
Gao et al., "Electrodeposition of Aluminium from $AlCl_3/Et_3NHCl$ Ionic Liquids," *Acta. Phys.—Chim. Sin.* 24(6):939-944, 2008.
Gao et al., "Band Gap Tuning of Hydrogenated Graphene: H Coverage and Configuration Dependence," *J. Phys. Chem. C* 115:3236-3242, 2011.
Geim, "Graphene: Status and Prospects," *Science* 324:1530-1534, 2009.
Geng et al., "Effects of Stage, Intercalant Species and Expansion Technique on Exfoliation of Graphite Intercalation Compound into Graphene Sheets," *Journal of Nanoscience and Nanotechnology* 11:1084-1091, 2011.
Guisinger et al., "Exposure of Epitaxial Graphene on SiC(0001) to Atomic Hydrogen," *Nano Letters* 9(4):1462-1466, 2009.
Holiday et al., "The chemistry of carbon: organometallic chemistry," *Pergamon Texts in Inorganic Chemistry* 6:1279, 1973.
Hsu et al., "Condensed-phase nanotubes," *Nature* 377:687, 1995.
Hsu et al., "Electrolytic formation of carbon nanostructures," *Chemical Physics Letters* 262:161-166, 1996.
Ilyin et al., "Computer simulation and experimental study of graphene-like structures formed by electrolytic hydrogenation," *Physica E* 43:1262-1265, 2011.
Jaiswal et al., "Controlled Hydrogenation of Graphene Sheets and Nanoribbons," *ACS Nano* 5(2):888-896, 2011.
Li et al., "Processable aqueous dispersions of graphene nanosheets," *Nature Nanotechnology* 3:101-105, 2008.
Liu et al., "Intercalation of Organic Ammonium Ions into Layered Graphite Oxide," *Langmuir* 18:4926-4932, 2002.
Malard et al., "Raman spectroscopy in graphene," *Physics Reports* 473:51-87, 2009.
Maluangnont et al., "Preparation of a Homologous Series of Graphite Alkylamine Intercalation Compounds Including an Unusual Parallel Bilayer Intercalate Arrangement," *Chemistry of Materials* 23:1091-1095, 2011.
Matis et al., "Surface Doping and Band Gap Tunability in Hydrogenated Graphene," *ACS Nano* 6(1):17-22, 2012.
Ryu et al., "Reversible Basal Plane Hydrogenation of Graphene," *Nano Letters* 8(12):4597-4602, 2008.
Simate et al., "The production of carbon nanotubes from carbon dioxide challenges and opportunities," *Journal of Natural Gas Chemistry* 19:453-460, 2010.
Sofo et al., "Graphane: A two-dimensional hydrocarbon," *Physical Review B* 75:153401, 2007. (4 pages).
Wang et al., "Toward High Throughput Interconvertible Graphane-to-Graphene Growth and Patterning," *ACS Nano* 4(10):6146-6152, 2010.
Zhang et al., "Physical Properties of Ionic Liquids: Database and Evaluation," *J. Phys. Chem. Ref. Data* 35(4):1475-1517, 2006.

* cited by examiner

PRODUCTION OF GRAPHENE

FIELD OF INVENTION

The present invention relates to a method for the production of graphene and related graphite nanoplatelet structures.

BACKGROUND

Graphene is an atomically thick, two dimensional sheet composed of $sp^2$ carbons in a honeycomb structure. It can be viewed as the building block for all the other graphitic carbon allotropes. Graphite (3-D) is made by stacking several layers on top of each other, with an interlayer spacing of ~3.4 Å and carbon nanotubes (1-D) are a graphene tube.

Single-layer graphene is one of the strongest materials ever measured, with a tensile strength of ~130 GPa and possesses a modulus of ~1 TPa. Graphene's theoretical surface area is ~2630 $m^2/g$ and the layers are gas impermeable. It has very high thermal (5000 W/mK) and electrical conductivities (up to 6000 S/cm).

There many potential applications for graphene, including but not limited to:
(a) additive for mechanical, electrical, thermal, barrier and fire resistant properties of a polymer;
(b) surface area component of an electrode for applications such as fuel cells, super-capacitors and lithium ion batteries;
(c) conductive, transparent coating for the replacement of indium tin oxide; and
(d) components in electronics.

Graphene was first reported in 2004, following its isolation by Professor Geim's group. Graphene research since then has increased rapidly. Much of the "graphene" literature is not on true monolayer graphene but rather two closely related structures:
(i) "few layer graphene", which is typically 2 to 10 graphene layers thick. The unique properties of graphene are lost as more layers are added to the monolayer and at 10 layers the material becomes effectively bulk graphite; and
(ii) Graphene oxide (GO), which is a graphene layer which has been heavily oxidised in the exfoliation process used to make it and has typically 30 at % oxygen content. This material has inferior mechanical properties, poor electrical conductivity and is hydrophilic (hence a poor water barrier).

There are a variety of methods to produce graphene [Ruoff 2009]. Novoselov et al. produced their first flakes by the mechanical exfoliation of graphite by using an adhesive tape to isolate individual layers [Novoselov 2004]. It has been shown subsequently that graphite can also be exfoliation by using ultrasonic energy to separate the layers when in an appropriate solvent, such as NMP (N-methylpyrrolidone) [Coleman 2008 & 2009].

Wang et al. have shown that ionic liquid are also appropriate solvents for ultrasonic exfoliation. In this case, they mixed graphite powder with ionic liquids such as 1-butyl-3-methyl-imidazolium bis(trifluoromethanesulfonyl)imide ([Bmim][Tf2N]) and then subjected the mixture to tip ultrasonication for a total of 60 minutes using 5-10 minute cycles. The resultant mixture was then centrifuged [Wang 2010]. Ionic liquids are used to stabilise the graphene produced by the ultrasonication.

Intercalation compounds can be produced by introducing a metal through the vapour phase and then reacting these ions—the layers of the intercalation compound can then be separated by stirring in an appropriate solvent, such as NMP [Valles 2008]. An intercalation approach has also been taken to separate graphene oxide aggregates by electrostatically attracting tetrabutylammonium cations in between the layers of the graphene oxide [Ang 2009]. This technique relies on the charges present in graphene oxide to attract the tetrabutylammonium cations.

Graphene can also be produced by chemical vapour deposition. For example, methane can be passed over copper [Bae 2010]. Alternatively silicon carbide can be decomposed to make a graphene film.

Electrochemical approaches can also be taken to exfoliate the graphene. Liu et al. [Liu 2008] reported the exfoliation of graphite using an ionic liquid-water mixture electrolyte to form "kind of IL-functionalized" graphene nanosheets. Scheme 1 in this paper suggests that the material was produced by the exfoliation of the anode but in their discussion the authors mention the role of the cation. Lu subsequently studied the route in more detail and discussed the possible mechanism involved in the production process [Lu, 2009]. In their paper, they stated "according to the proposed mechanism by Liu, the positively charged imidazolium ion is reduced at the cathode to form the imidazolium free radical which can insert into the bonds of the graphene plane. At the fundamental level, there are several questionable aspects about the radical-insertion mechanism proposed by Liu, especially when the ILs are mixed with water at 1:1 ratio and where an operational voltage as high as 15 V is applied". Lu et al. showed that the graphene nanosheet production is exclusively at the anode and is due to an interaction of decomposed water species and the anions from the ionic liquid, such as $BF_4^-$.

The co-pending international application, published as WO 2011/162727, discloses the formation of graphene using lithium ion exfoliation of graphite, the exfoliation being aided by the insertion of solvent between the layers and sonication. This work is also discussed in a related paper [Wang 2011].

Further methods for the production of graphene are desired—in particular, methods that produce graphene sheets with a controlled number of layers and flake size. Advantageously, the methods should be scalable to allow for the production of graphene on a large scale.

DESCRIPTION OF THE INVENTION

The present inventors have conceived a method for the production of graphene and related graphite nanoplatelet structures by exfoliation driven by the electrochemical insertion of positive alkylammonium ions (cations) into a negative graphitic electrode. Without wishing to be bound by theory, it is thought that by using cations to exfoliate the negative electrode, the possibility of the formation of graphene oxide through oxidative attack is reduced.

In the present application, the term "graphene" is used to describe materials consisting of ideally one to ten graphene layers, preferably where the distribution of the number of layers in the product is controlled. The method can also be used to make graphite nanoplatelet structures under 100 nm in thickness, preferably under 10 nm in thickness and more preferably under 1 nm in thickness. The size of the graphene flakes produced can vary from nanometers across to millimeters, depending on the morphology desired.

In some aspects of the invention, the material produced is graphene having up to ten layers. The graphene produced may have one, two, three, four, five, six, seven, eight, nine or ten layers. It may be preferred that the material produced is substantially free of graphene oxide. "Substantially free"

means less than 10% by weight, preferably less than 5% by weight, more preferably less than 1% by weight of graphene oxide.

In other aspects of the invention, the material produced may comprise at least 10% by weight of graphene having up to ten layers, preferably at least 25% by weight and more preferably at least 50% by weight of graphene having up to ten layers.

The intercalation of cations into graphite cathodes (negative potential) under electrochemical reactions is well known and is, for example, the basis of lithium ion batteries. It is also known that if too many ions are intercalated then the negative electrode disintegrates. Furthermore, the size of the cation has a significant effect. For example, Simonet and Lund reported in 1977 whilst studying the electrochemical behaviour of graphite negative electrodes in the presence of tetralkylammonium cations that "in the presence of very large cations the cathode disintegrates" [Simonet 1977].

Under the right conditions the fragments from the disintegrated negative electrode can be nanoscale forms of a carbon. The production of carbon nanotubes from the intercalation of alkali metal ions into a graphite cathode has been reported by Kinloch et al. [Kinloch 2003]. These nanotubes were produced using a molten alkali halide electrolyte at high temperatures (600° C. or higher). In addition to carbon nanotubes, graphite platelets, carbon nanoparticles and amorphous structures were observed. However, no graphene was reported.

The present invention provides a method for the production of graphene and graphite nanoplatelet structures having a thickness of less than 100 nm in an electrochemical cell, wherein the cell comprises:
(a) a negative electrode which is graphitic;
(b) a positive electrode which may be graphitic or another material; and
(c) an electrolyte which consists of ions in a solvent, where the cations are alkylammonium ions;
and wherein the method comprises the step of passing a current through the cell.

The negative electrode is the electrode held at the most negative potential out of the two electrodes. A reference electrode may also be used.

Negative Electrode

The negative electrode may comprise a layered graphite compound in which cations can be intercalated. Preferred materials include highly ordered pyrolytic graphite (HOPG), natural and synthetic graphite. The electrode may be a single graphitic crystalline flake or many flakes held together. In the latter case, the crystals may be placed on an conductive surface, physically pressed together or held together using a binder such a pyrolysed polymer (e.g. an extruded graphite rod). The minimum lateral dimensions of the graphite flakes are preferably at least 1 nm, more preferably at least 100 nm and most preferably at least 1 micron. The maximum lateral dimensions of the graphite flakes are preferably no more than 10 cm, more preferably no more than 1 mm and most preferably no more than 100 microns. In one embodiment, the flakes are orientated so that the [002] direction is parallel to the surface of the electrode, exposing the galleries for intercalation.

The negative electrode may comprise partially exfoliated graphene oxide.

The negative electrode material may be treated prior to use in order to improve its electrochemical exfoliation. In one embodiment the electrode is made from material which has been previously partially exfoliated using other methods such gaseous expansion or intercalation from the vapour phase. For example, commercially available material from companies such as XG Sciences and Angstrom could be used for the electrode material.

In some embodiments, the negative electrode may be surrounded by a membrane. Without wishing to be bound by theory, the use of a membrane may help retain any exfoliated material in electrical contact with the negative electrode allowing for further intercalation of the cations. In some embodiments, the pore size of the membrane may vary from 10 nm to 500 nm. Suitable membranes include cellulose dialysis membrane (e.g., Spectra Por 7, 25 nm pores) and polycarbonate membranes (e.g. 450 nm pores).

In some embodiments, the negative electrode may be of a ladle design to avoid issues with disintegration of the electrode into large pieces. In other embodiment, the graphite negative electrode may be held at a liquid-liquid interface. In such an embodiment, the negative electrode may be a liquid metal such as mercury or gallium on which graphite flakes are placed, allowing continual contact with the graphitic material as it is exfoliated into the desired material.

Positive Electrode

The positive electrode may consist of any suitable material known to those skilled in the art as it does not play a role in the graphene production, other than to provide a counter electrode for the anions. Preferably, the positive electrode is made from an inert material such as gold, platinum or carbon.

When the reaction at the positive electrode generates a gas the electrode surface area is as large as possible to prevent gas bubbles wetting it and/or disrupting the process at the negative electrode. The positive and/or reference electrode may also be placed in a membrane or molecule sieve to prevent undesired reactions in the electrolyte or at either electrode.

Electrolyte

The electrolyte comprises ions in a solvent, wherein the cations are alkylammonium ions.

Tetraalkyl ammonium cations are preferable, including tetrabutyl ammonium (TBA, $[(C_4H_9)_4N^+]$), tetraethyl ammonium (TEA, $(C_2H_5)_4N^+$) and tetramethyl ammonium (TMA, $(CH_3)_4N^+$). The alkyl chains may contain up to 100 carbon atoms, more preferably up to 20 carbon atoms and most preferably up to 5 carbon atoms long. The alkyl chains may contain only a single carbon atom, but preferably contain at least two carbon atoms. The alkyl chains may all be the same, or may be different. Furthermore, a mixture of different cations maybe used.

Dialkylammonium cations and trialkylammonium cations may be also used in the invention, including tributyl ammonium ($[(C_4H_9)_3NH^+]$), triethyl ammonium ($(C_2H_5)_3NH^+$), triemethyl ammonium ($(CH_3)_3NH^+$), dibutyl ammonium ($[(C_4H_9)_2NH_2^+]$), diethyl ammonium ($(C_2H_5)_2NH_2^+$) and diemethyl ammonium ($(CH_3)_2NH_2^+$). The alkyl chains may contain up to 100 carbon atoms, more preferably up to 20 carbon atoms and most preferably up to 5 carbon atoms long. The alkyl chains may contain only a single carbon atom, but preferably contain at least two carbon atoms. The alkyl chains may all be the same, or may be different.

Furthermore, a mixture of different cations may be used, including a mixture of dialkylammonium cations, trialkylammonium cations and tetraalkyl ammonium cations.

The counter-ions may be relatively lipophilic ions, e.g. tetrafluoroborate ($BF_4^-$), perchlorate ($ClO_4^-$) or hexafluorophosphate ($PF_6^-$). Other soluble, inorganic ions may be used, such as tetraphenyl borate.

Solvents which can be used include NMP, DMSO (dimethyl sulfoxide), DMF (N,N'-dimethyl formamide) and mixtures thereof. In one embodiment, the solvent used has an affinity for graphene or graphite nanoplatelet structures so that the material produced at the electrode is taken away by the solvent. In another embodiment, the solvent has no affinity for graphene or graphite nanoplatelet structures, so that the material produced falls to the bottom of the electrochemical cell, allowing easy collection of the graphene produced.

In some embodiments, the concentration of the alkyl ammonium cations may be a minimum of 1 mM, 0.1 M, 0.2 M or 0.5 M. The maximum concentration may be 2M, 1.5M or 1M.

Cell Potential and Current Density

The working potential of the cell will be at least that of the standard potential for reductive intercalation. An overpotential may be used in order to increase the reaction rate and to drive the cations into the galleries of the graphite at the negative electrode. Preferably an overpotential of 1 mV to 10 V is used against a suitable reference as known by those skilled in the art, more preferably 1 mV to 5 V. In cells, with only two terminals, and no reference, a larger potential may be applied across the electrodes but a significant amount of the potential drop will occur over the cell resistance, rather than act as an overpotential at the electrodes. In these cases the potential applied may be up to 20V or 30V.

The voltage applied across the electrodes may be cycled or swept. In one embodiment, both the electrodes are graphitic and the potential is swept so that electrodes change from positive to negative and vice versa. In this embodiment the cationic exfoliation would occurs at both electrodes, depending on the polarity of the electrode during the voltage cycle.

The current density at the negative electrode will be controlled through a combination of the electrode's surface area and overpotential used.

Operating Temperature

The cell is operated at a temperature which allows for production of the desired material.

The cell may be operated at a temperature of at least 10° C., preferably at least 20° C. The maximum cell operating temperature may be 100° C., and more preferably 90° C., 80° C., 70° C. or 50° C. In some embodiments, the cell may be operated at a temperature of at least 30, 40 or 50° C. The maximum cell operating temperature may be as high as 120° C. The optimum operating temperature will vary with the nature of the solvent. Operating the cell up to the boiling point of the electrolyte may be carried out in the present invention.

Recovery of Cation

In one embodiment, the cation used for the exfoliation is recovered after exfoliation. The cation may be recovered by washing and/or heating of the exfoliated material, electrochemical reduction of the cation, ultrasonic energy treatment of the exfoliated material, displacement from the exfoliated material by surfactants or combinations thereof.

Further Method Steps

In one embodiment, organic ions may be added in a second stage, in order to favour the exfoliation of graphite through a process of polymerization and expansion between the graphene layers. Suitable organic ions include monomers for polymerisation possessing electron-withdrawing groups such as nitrile, carboxyl, phenyl, and vinyl.

The graphene or graphite nanoplatelet structures having a thickness of less than 100 nm produced by the method of the invention may be separated from the electrolyte by a number of separation techniques, including:

(a) filtering;
(b) using centrifugal forces to precipitate the graphene or graphite nanoplatelet structures; and
(c) collecting the graphene or graphite nanoplatelet structures at the interface of two immiscible solvents.

The electrochemically exfoliated graphene or graphite nanoplatelet structures may be further treated after exfoliation. For example, the materials may be further exfoliated using ultrasonic energy and other techniques known to those skilled in the art to decrease the flake size and number of graphene layers.

The graphite at the negative electrode may be functionalised electrochemically prior to its exfoliation, for example, by oxidation in nitric acid or fluorination using hydrofluoric acid. In these cases the negative electrode would become the positive electrode during the functionalisation. In some circumstances, the voltage may be reversed to cycle the electrochemical exfoliation and functionalisation steps.

Analysis of Graphene by Raman Spectroscopy

It is well established in the literature that Raman spectroscopy can be used to measure the number of layers that a flake possesses through the shape, intensity and position of the G ($\sim$1580 cm$^{-1}$) and 2D ($\sim$2700 cm$^{-1}$) peaks (some of the literature calls the 2D peak the G' peak.) The exact positions of the peaks depend on the excitation wavelength used and the level of doping in the sample [Ferrari 2006]. In general, single layer graphene comprises of 2D peak which can be fitted with a single component and is similar or higher in intensity than the G peak. This G' peak is at approximately 2637 cm$^{-1}$ when measured using a 633 nm excitation laser. As the number of layers increase, the G' peak decreases in relative intensity to the G peak. The G' peak also widens and its position increases in wavenumber [Hao 2010]. For example, the 2D peak for two layers is well described by four components.) Significantly as the number of layers increase, the spectra become less symmetrical and approaches a peak with two components with a main peak with a less intense shoulder at a lower wavenumber.

The G' peak would be expected to be centred at approximately 2637, 2663, 2665, 2675 and 2688 cm$^{-1}$ for 1-layer, 2-layer, 3-layer, many-layer and graphite respectively using a 633 nm laser to measure flakes deposited on a silicon oxide wafer.

BRIEF DESCRIPTION OF THE DRAWINGS

FIG. 7a shows the Raman spectra of the material produced in Example 6a;

EXAMPLES

All the Raman spectroscopy was conducted using a 633 nm excitation laser.

Example 1

Figure 1:
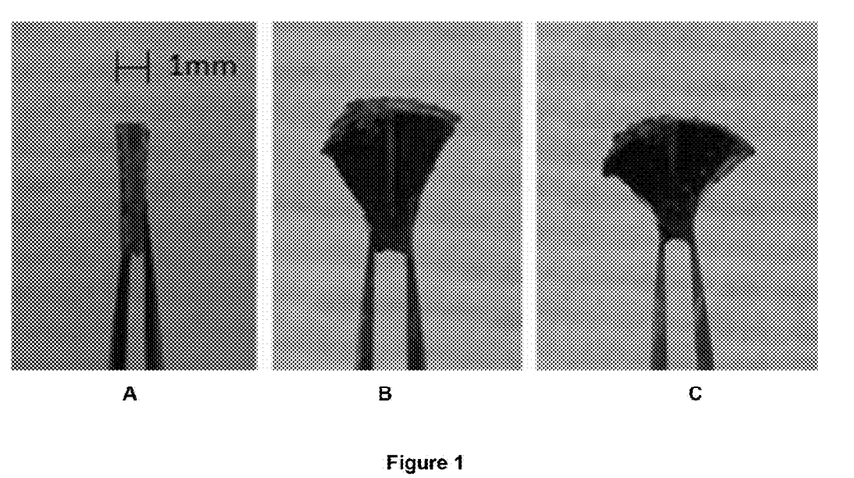
FIG. 1 shows the expansion and exfoliation of a HOPG electrode upon the electrochemical insertion of TBA cations.
Figure 2:
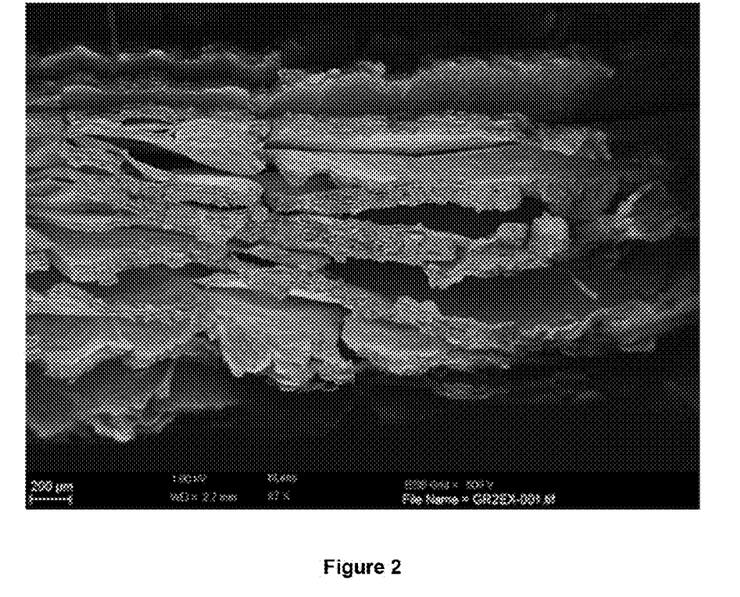
FIG. 2 shows a scanning electron micrograph of an electrode in which TBA has been intercalated as in FIG. 1.

A piece of HOPG (FIG. 1A) was held in self-closing tweezers and submerged into an NMP-0.1 molar TBA electrolyte (anion: $BF_4^-$) at room temperature. The HOPG was used as the negative electrode and a platinum wire as the positive electrode. A potential of −4.50V vs platinum wire was applied. A second platinum wire was used as the reference electrode. After 15 minutes the expansion of the electrode due to intercalation was visible to the eye, as shown in FIG. 1B. FIG. 1C shows the expansion after 30 minutes. Scanning electron microscopy confirmed that the electrode has been expanded (as shown in FIG. 2).

Example 2

Figure 3:
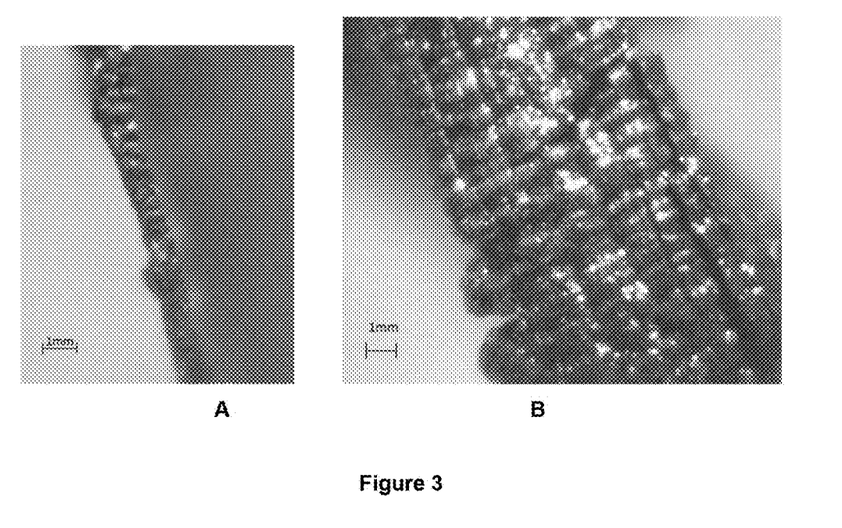
FIG. 3 shows the expansion and exfoliation of a HOPG electrode upon the electrochemical insertion of TBA cations under cyclic voltammetry.

A piece of HOPG was held in self-closing tweezers and subject to cyclic voltammetry. (A NMP-TBA electrolyte NMP-0.1 molar TBA electrolyte (anion: $BF_4^-$) was used with platinum wire reference and counter electrodes at room temperature.) The HOPG was used as the negative electrode and a platinum wire as the positive electrode. The applied potential to the negative electrode was swept from −0.10V to −4.50V versus the platinum and back again. The resulting voltammogram displayed clear current responses relating to the intercalation/deintercalation of the cation. This cycle was repeated continuously at room temperature. After 20 hours, the HOPG was observed to have expanded in volume by approximately 9 times. FIG. 3 shows the edge of the HOPG before cyclic voltammetry (A) and after cyclic voltammetry (B).

Example 3

Figure 4:
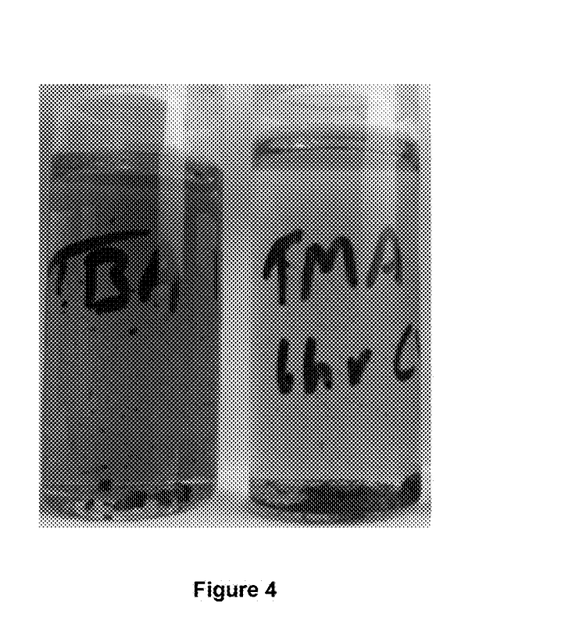
FIG. 4 shows optical micrographs of the material produced by ultrasonicating the negative electrode and electrolyte after electrochemical intercalation of TBA and TMA respectively.

The effect of ion size was studied on the electrochemical exfoliation of HOPG. Two cells were set up as described in Example 1, the only difference being that in one cell the TBA cation was replaced with a TMA (tetramethyl ammonium) cation. After 6 hours, the negative electrode and electrolyte were ultrasonicated in an ultrasonic bath. The dispersed material was then transferred to a vial and left to settle, as shown in FIG. 4 (TBA on left; TMA on right). When TBA was used as the electrode, a dispersion of nanomaterial was produced, whereas when TMA was used as the electrolyte, the material produced was found to predominantly settle at the bottom of the vial.

Figure 5A:
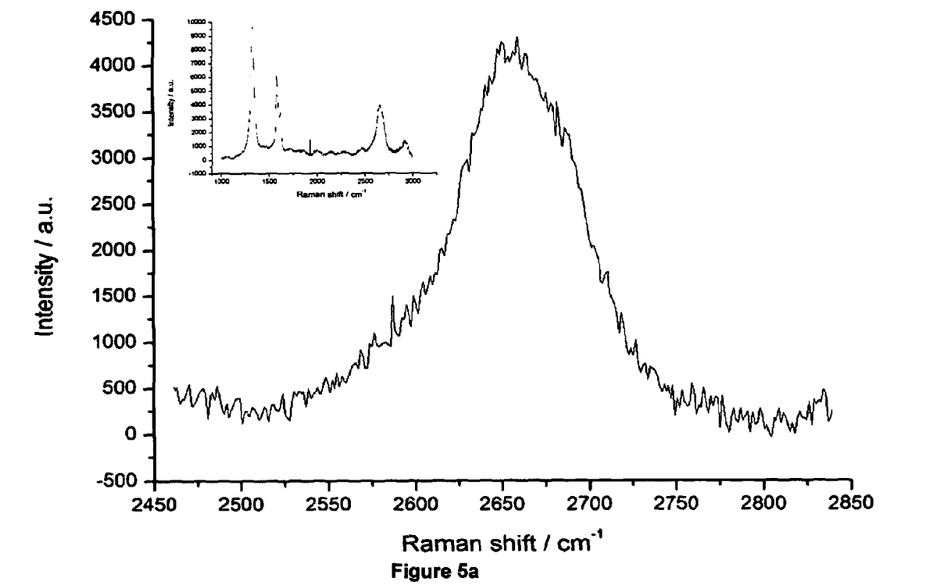
FIG. 5a shows the Raman spectra of the material in FIG. 4 produced using TBA.
Figure 5B:
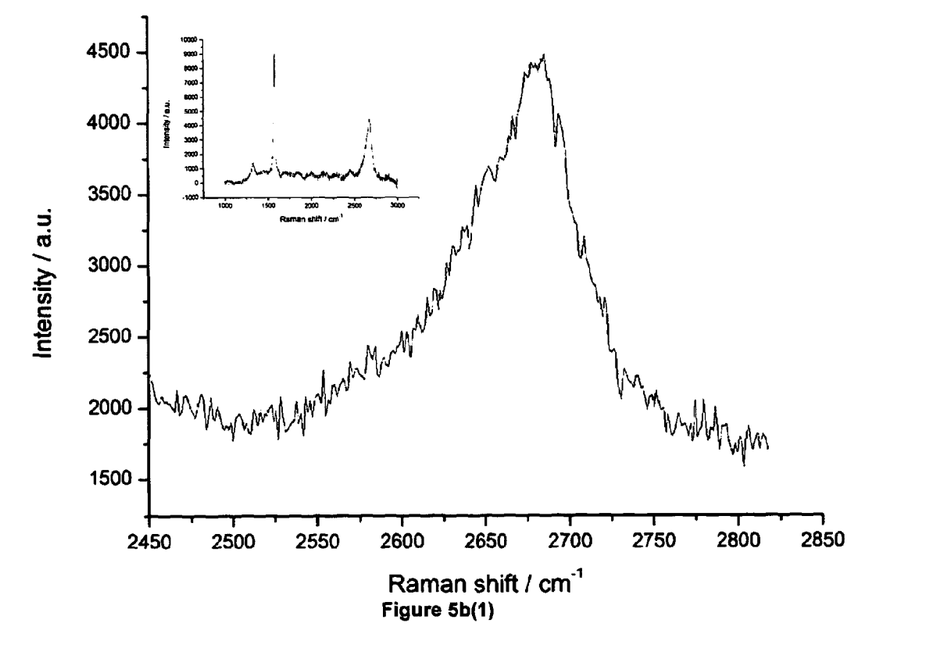
FIG. 5b shows Raman spectra of the material in FIG. 4 produced using TMA.

FIG. 5a shows Raman spectra of material produced when TBA was used as the electrolyte. These spectra are typical of those from few-layer flakes of graphene. FIG. 5b shows three Raman spectra of various materials produced with TMA was used as the electrolyte. These spectra are those typical of graphite-like flakes and few-layer flakes of graphene.

Example 4

The effects of ion size, operating temperature and sonication were studied on the electrochemical exfoliation of HOPG.

A piece of HOPG (typical approximate dimensions: 5×5×2 mm, 0.01 g,) was held in self-closing tweezers and submerged into 10 mL NMP-0.1 molar TBA electrolyte (anion: $BF_4^-$) at 25° C. The HOPG was used as the negative electrode and a platinum mesh as the positive electrode. A potential of −5.00V vs platinum mesh was applied. A platinum wire was used as the reference electrode. The potential was applied for 6000 s (about 1.5 hours). The HOPG electrode was then removed and sonicated in the electrolyte for a period of time (maximum 6 hours, minimum 2 min).

This procedure was repeated at 50° C., 80° C. and 120° C.

Sonicated samples were then centrifuged at 13,500 rpm for 30 minutes and a 1 mL aliquot of the supernatant decanted and filtered through pre-weighed alumina 13 mm diameter membranes (pore size of 0.01 μm)

The membranes were washed with acetone, air-dried and weighed again. Raman analysis of the graphitic residue was conducted using a 633 nm laser (10% power) directly on the alumina membranes. The results of the Raman analysis are summarised below:

| | TBA Intercalation temperature | | | |
|---|---|---|---|---|
| Sonication time | 25° C. | 50° C. | 80° C. | 120° C. |
| 2 minutes | graphite-like flakes | graphite-like flakes | graphite-like flakes | No products |
| 10 minutes | graphite-like flakes | graphite-like flakes | 5-10 layers and few layer | No products |
| 30 minutes | graphite-like flakes | 5-10 layers, possible bilayer | 5-10 layers and few layers | No products |
| 6 hours | 10 layer | 5-10 layers | 5-10 layers and few layers | No products |

A slight colourisation of the solvent was often observed with the electrolyte appearing yellow in colour post intercalation. This colour was enhanced with increasing intercalation potential and increasing time, eventually turning dark brown at 120° C. A control experiment using platinum electrodes for the reference, working and counter electrode suggested that that this colour change was due to the degradation of the electrolyte.

Further variations on the above procedure involved the use of less negative potentials (potentials in the range of −3.5 V to −5.0 V were found to be effective for exfoliation) and the use of potential waveforms, e.g. cycling the potentials linearly between −1.0 and −5.0 V. Positive potentials were avoided because of the risk of graphite oxidation.

Other tetralkyammonium cations (specifically tetramethylammonium, TMA and tetraethylammonium, TEA) were also employed for exfoliation studies.

Example 5

Commercial graphite flakes (Alfa Aesar 325 mesh, <44 micron) held inside a membrane which was clamped to a 5 mm diameter graphitic rod with an O-ring was used as a negative electrode. The membranes used were:
(a) cellulose dialysis membrane (Spectra Por 7, 25 nm pores); and
(b) polycarbonate membranes (with larger pores, 450 nm).

Figure 6A:
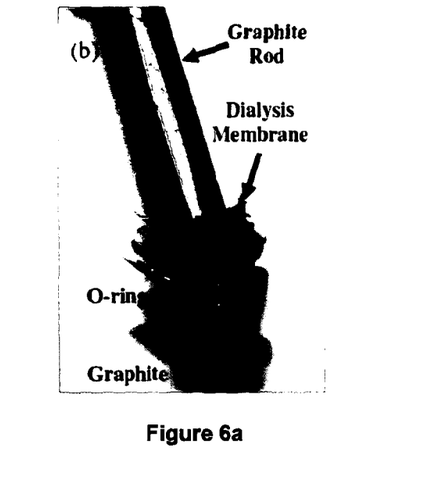
FIG. 6a shows the experimental set-up used to hold graphite flakes in electrical contact to a graphite electrode by the use of a membrane for Example 5.

A photograph of the approach is shown in FIG. 6a.

The membrane negative electrode was submerged into NMP-0.1 molar TEA electrolyte (anion: $BF_4^-$) at 25° C. A platinum mesh was used as the positive electrode. A potential of −5.00V vs. platinum mesh was applied. A platinum wire was used as the reference electrode. The potential was applied for 2 hours.

Figure 6B:
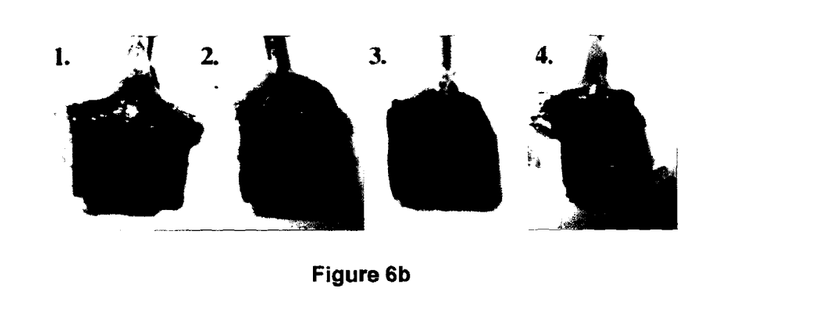
FIG. 6b shows the pitting and fragmentation of the graphite rod used to make contact to the membrane-bound flakes in Example 5.
Figure 6C:
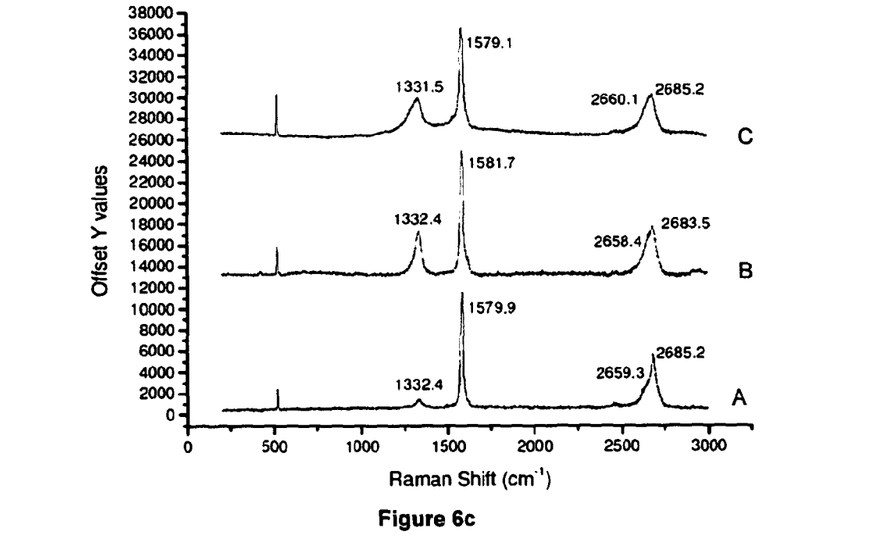
FIG. 6c shows typical Raman spectra for samples produced in Example 5.

During these experiments, the cathode graphite rod was found to erode and pit (FIG. 6b) and the graphite powder within the membrane breakdown. These phenomena can be clearly seen in cases 1 and 2 in FIG. 6b. Raman analysis of the powder within the membrane found that the samples did exfoliate the graphite into few layer graphene without the aid of a subsequent exfoliation step. It was also found that applying a subsequent ultrasonification step (of 3 or 7 hours) did not exfoliate the sample further into thinner layers. The resulting Raman spectra are shown in FIG. 6c (A—no ultrasonification; B—3 hours ultrasonification; C—7 hours ultrasonification).

Example 6

Figure 7A:
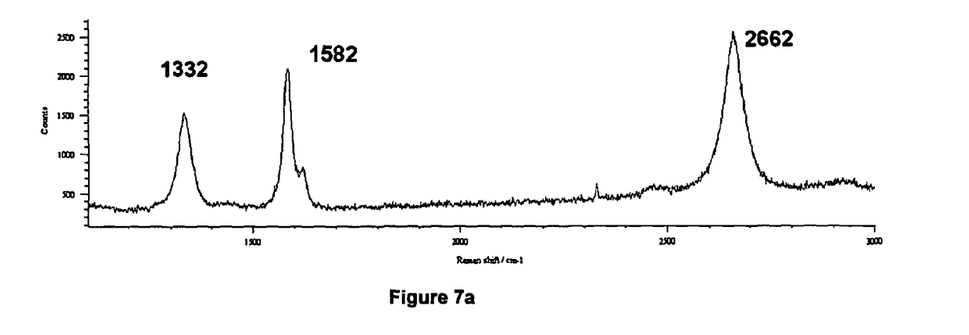
Figure 7B:
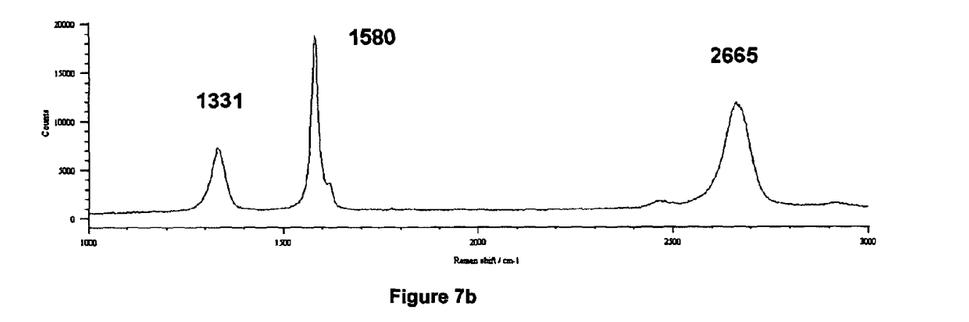
FIG. 7b shows the Raman spectra of the material produced in Example 6b.
Figure 7C:
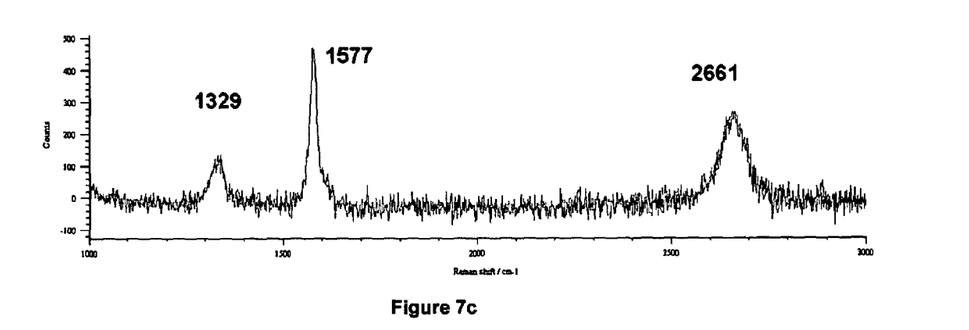
FIG. 7c shows the Raman spectra of the material produced in Example 6c.
Figure 7D:
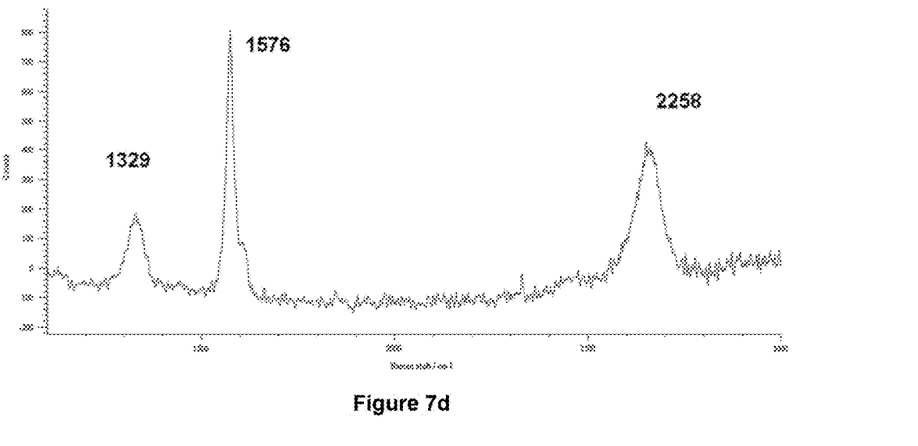
FIG. 7d shows the Raman spectra of the material produced in Example 6d.

Further experiments were carried out, using TMA as the cations, and at room temperature.
(a) Two graphite rods were used as the electrodes with no reference electrode. The electrolyte was 20 ml DMSO with 1.09 g TMA Chloride. A constant potential of 20V was applied to the cell for 10 minutes. The Raman spectrum of the resulting material is shown in FIG. 7a.
(b) A graphite rod cathode and platinum mesh anode were used as the electrodes. The graphite rod was covered with a dialysis membrane (Spectrum, spectra Por 7, 25 nm pores) to keep the electrolysis product in physical contact with the cathode. The electrolyte was 20 ml DMSO with 1.09 g TMA Chloride. A constant potential of 30V was applied for 30 minutes. The Raman spectrum of the resulting material is shown in FIG. 7b.
(c) This experiment was very similar to (b) above, except that the anode was a graphite rod, and the potential applied was 20V. The Raman spectrum of the resulting material is shown in FIG. 7c. The 2D peak was shifted more in this experiment, than in (b).
(d) This experiment was very similar to (b) above, except that the cathode was graphite flakes coated on 4 mm diameter stainless steel rod and covered with the dialysis membrane. A potential of 20V was applied for 30 minutes. The Raman spectrum of the resulting material is shown in FIG. 7d. The 2D peak is at 2258 $cm^{-1}$ and its width at half height is 51 $cm^{-1}$.

In all the above experiments, the Raman spectra provide evidence of the formation of few layer graphene (or thinner).

Example 7

Intercalation of the graphite rods (grade EC4 and EC5, Tokai Carbon Europe) was carried out using the cations TMA, TEA and TBA all with the tetrafluoroborate counterion in NMP as the solvent, and the cations at 0.1 molar with an operating temperature of 25° C. A platinum mesh was used as the positive electrode, with a platinum wire as the reference electrode. A potential of −5.00V vs platinum wire was applied. Bubbles immediately formed at the graphite rod and the electrode began to exfoliate after several hundred seconds. It could be seen that the rate of exfoliation began slowly and increased until approximately 1000 s at which point a steady rate was reached. The electrolyte gradually turned brown over time.

Figure 8:
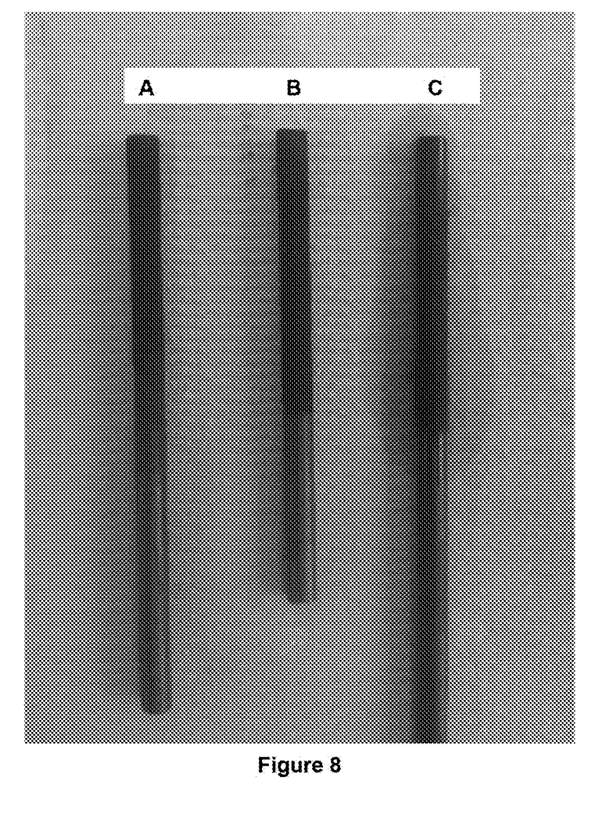
FIG. 8 shows graphite rods after the method of Example 7 has been carried out.

FIG. 8 shows the resulting graphite rods (A: TMA; B: TBA; C: TEA). The rough texture formed on the electrode post intercalation could be easily rubbed off to reveal a clean smooth surface.

REFERENCES

The following documents are all incorporated herein by reference.

[Novoselov 2004] Electric field effect in atomically thin carbon films, K. S, Novoselov et al., Science, 2004, 5296, pp 666-669.

[Ruoff 2009] Chemical methods for the production of graphenes, S. Park and R. S. Ruoff, Nature Nanotechnology, 2009, DOI:10.1038/nnano.2009.58

[Bae 2010] Roll-to-roll production of 30-inch graphene films for transparent electrodes, S. Bae et al. Nature Nanotechnology, 2010, DOI: 10.1038/NNANO.2010.132

[Ang 2009] High-Throughput Synthesis of Graphene by Intercalation-Exfoliation of Graphite Oxide and Study of Ionic Screening in Graphene Transistor, P. K. Ang et al., ACS Nano, 2009, 3(11), pp. 3587-3594

[Wang 2010] Direct exfoliation of natural graphite into micrometer size few layers graphene sheets using ionic liquids, X. Wang et al., Chem. Commun., 2010, 46, pp. 4487-4489

[Liu 2008] N. Liu et al, One-Step Ionic-Liquid-Assisted Electrochemical Synthesis of Ionic-Liquid-Functionalized Graphene Sheets Directly from Graphite. Adv. Funct. Mater. 2008, 18, pp. 1518-1525

[Lu 2009] One-Pot Synthesis of Fluorescent Carbon Nanoribbons, Nanoparticles, and Graphene by the Exfoliation of Graphite in Ionic Liquids, ACS Nano, 2009, 3(8) pp. 2367-2375

[Simonet 1977] J. Simonet and N. Lund, Electrochemical Behavious of Graphite Cathodes in the Presence of Tetralkylammonium Cations, J. Electroanal. Chem., 1977, 75, pp. 719-730

[Kinloch, 2003] I. A. Kinloch et al, Electrolytic, TEM and Raman studies on the production of carbon nanotubes in molten NaCl, Carbon, 2003, 41, pp. 1127-1141

[Coleman 2008 & 2009] Y. Hernandez, et al, Nat. Nanotechnol., 2008, 3, 563; M. Lotya, et al, J. Am. Chem. Soc., 2009, 131, 3611.

[Valles 2008] Valles, C. et al. Solutions of negatively charged graphene sheets and ribbons. J. Am. Chem. Soc. 130, 15802-15804 (2008).

[Ferrari 2006] Ferrari, A. C. et al. Raman Spectrum of Graphene and Graphene Layers. Phys Rev Lett, 97 (2006), 187401

[Hao 2010] Hao, Y et al., Probing Layer Number and Stacking Order of Few-Layer Graphene by Raman Spectroscopy, Small, 2010, 6(2), 195-200

[Wang 2011] Wang, J., et at, High-yield synthesis of few-layer graphene flakes through electrochemical expanstion of graphite in propylene carbonate electrolyte, JACS, 2011, 133, 8888-8891

The invention claimed is:
1. A method for producing graphene and graphite nanoplatelet structures having a thickness of less than 100 nm, in an electrochemical cell, comprising:

passing a current through the electrochemical cell, wherein the electrochemical cell comprises:

(a) a negative electrode which is graphitic;

(b) a positive electrode; and (c) an electrolyte which comprises ions in a solvent, said ions comprising cations and anions, wherein the cations comprise alkylammonium ions, and thereby producing graphene and graphite nanoplatelet structures having a thickness of less than 100 nm in the electrochemical cell.

2. The method of claim 1, wherein the negative electrode comprises a layered graphite compound in which the cations can be intercalated.

3. The method of claim 1, wherein the negative electrode comprises a graphite compound that is selected from highly ordered pyrolytic graphite, natural graphite and synthetic graphite.

4. The method of claim 1, wherein the alkylammonium cations comprise tetraalkyl ammonium cations.

5. The method of claim 4, wherein the tetraalkyl ammonium cations are selected from tetrabutyl ammonium, tetraethylammonium and tetramethyl ammonium.

6. The method of claim 1, wherein the alkylammonium cations comprise trialkyl ammonium cations.

7. The method of claim 6, wherein the trialkyl ammonium cations are selected from tributyl ammonium, triethylammonium and trimethyl ammonium.

8. The method of claim 1, wherein the alkylammonium cations comprise dialkyl ammonium cations.

9. The method of claim 8, wherein the dialkyl ammonium cations are selected from dibutyl ammonium, diethylammonium and dimethyl ammonium.

10. The method of claim 1, wherein the anions are selected from tetrafluoroborate, perchlorate and hexafluorophosphate.

11. The method of claim 1, which is carried out at a temperature from 20° C. to 100° C.

12. The method of claim 1 which further comprises separating the graphene or graphite nanoplatelet structures having a thickness of less than 100 nm from the electrolyte by at least one technique selected from:

(a) filtering;

(b) using centrifugal forces to precipitate the graphene or graphite nanoplatelet structures; and (c) collecting the graphene or graphite nanoplatelet structures at the interface of two immiscible solvents.

13. The method of claim 1, wherein the graphene or graphite nanoplatelet structures having a thickness of less than 100 nm are electrochemically exfoliated from at least one electrode and wherein the method further comprises ultrasonicating the graphene or graphite nanoplatelet structures.

14. The method of claim 1 which comprises electrochemically functionalizing graphite at the negative electrode by oxidation in nitric acid or by fluorination with hydrofluoric acid, prior to the step of passing current through the electrochemical cell.

15. The method of claim 1, wherein the positive electrode is graphitic.

16. The method according of claim 1, wherein the negative electrode is selected from highly ordered pyrolytic graphite, natural graphite and synthetic graphite, and wherein the alkylammonium cations comprise tetraalkyl ammonium.

17. The method of claim 1 in which at least one of (i) the negative electrode is selected from highly ordered pyrolytic graphite, natural graphite and synthetic graphite, and the alkylammonium cations comprise trialkyl ammonium, and (ii) the negative electrode is selected from highly ordered pyrolytic graphite, natural graphite and synthetic graphite, and the alkylammonium cations comprise dialkyl ammonium.

18. The method of claim 1, wherein the negative electrode is selected from highly ordered pyrolytic graphite, natural graphite and synthetic graphite, the cations comprise tetraalkyl ammonium and the anions are selected from tetrafluoroborate, perchlorate and hexafluorophosphate.

19. The method of claim 1, wherein the negative electrode is selected from highly ordered pyrolytic graphite, natural graphite and synthetic graphite, the cations comprise trialkyl ammonium and the anions are selected from tetrafluoroborate, perchlorate and hexafluorophosphate.

20. The method of claim 1, wherein the negative electrode is selected from highly ordered pyrolytic graphite, natural graphite and synthetic graphite, the cations comprise dialkyl ammonium and the anions are selected from tetrafluoroborate, perchlorate and hexafluorophosphate.

21. The method of claim 1 wherein the solvent is selected from N-methylpyrrolidone (NMP), dimethyl sulfoxide (DMSO), N,N'-dimethyl formamide (DMF), and mixtures thereof.

* * * * *

UNITED STATES PATENT AND TRADEMARK OFFICE
CERTIFICATE OF CORRECTION

| | |
|---|---|
| PATENT NO. | : 9,656,872 B2 |
| APPLICATION NO. | : 14/004365 |
| DATED | : May 23, 2017 |
| INVENTOR(S) | : Robert Angue William Dryfe et al. |

Page 1 of 1

It is certified that error appears in the above-identified patent and that said Letters Patent is hereby corrected as shown below:

On the Title Page

Item (56):
Column 2, Line 10:
"CN    201465309 A    5/2012"
Should read:
--CN    102465309 A    5/2012--.

Item (56):
Column 2, Line 17:
"WO 2007/046716 A1 4/2007"
Should read:
--WO 2007/046713 A1 4/2007--.

Item (56):
Column 2, Line 34:
"Chung et al. "Origin of Graphite Exfoliation an Investigation of the Important Role of Solvent Cointercalation" Journal of the Electrochemical Society, 147 (12) 4391-4398 (2000).*"
Should read:
--Chung et al. "Origin of Graphite Exfoliation An Investigation of the Important Role of Solvent Cointercalation" Journal of the Electrochemical Society, 147 (12) 4391-4398 (2000).*--.

Item (56):
Page 2, Column 2, Line 49:
"Simate et al., "The production of carbon nanotubes from carbon dioxide challenges and opportunities," *Journal of Natural Gas Chemistry 19*:453-460, 2010."
Should read:
--Simate et al., "The production of carbon nanotubes from carbon dioxide: challenges and opportunities," *Journal of Natural Gas Chemistry 19*:453-460, 2010.--.

Signed and Sealed this
Thirty-first Day of October, 2017

Joseph Matal
*Performing the Functions and Duties of the
Under Secretary of Commerce for Intellectual Property and
Director of the United States Patent and Trademark Office*